Sept. 5, 1933.　　　O. G. HALLIBURTON　　　1,925,095
ELECTRIC SWIVEL CONNECTION
Filed April 14, 1930
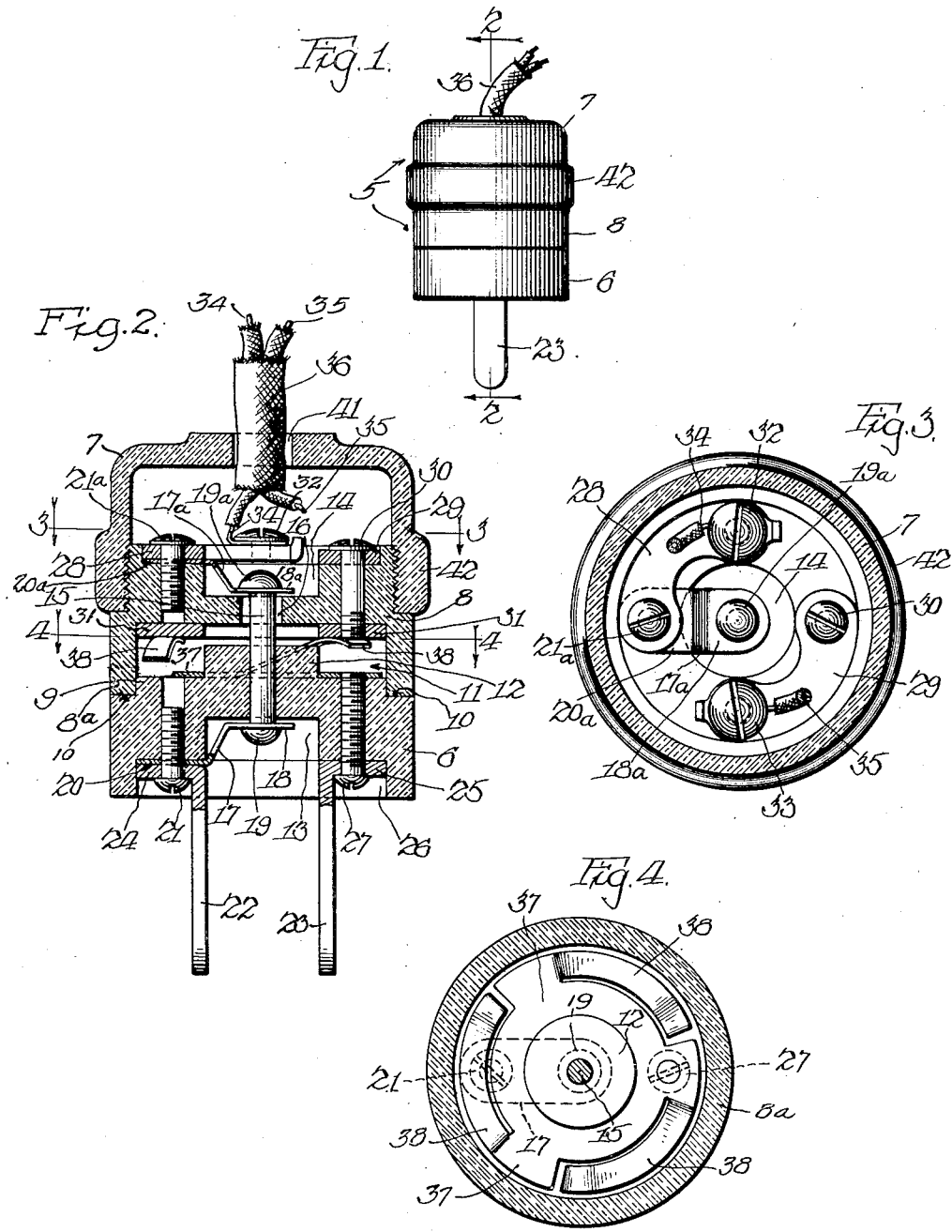
Inventor
Orville G. Halliburton
By Luther Johns
Atty.

Patented Sept. 5, 1933

1,925,095

UNITED STATES PATENT OFFICE 1,925,095

ELECTRIC SWIVEL CONNECTION

Orville G. Halliburton, Chicago, Ill.

Application April 14, 1930. Serial No. 444,003

3 Claims. (Cl. 173—324)

These improvements relate to electric swivel connections of the kind suitable for connecting a portable or otherwise movable electrical device with a stationary socket.

The chief object is to provide a swivel connection having parts which operate freely and easily one upon the other while maintaining the continuity of both lines of the circuit through the device. It is an object to provide a swivel connection of this kind which is of strong and durable construction, not likely to get out of order, of few parts and cheap in manufacture. Other objects and advantages will appear hereinafter.

It is old to provide swivel connections of this general type, and the present improvements are directed chiefly to constructional details and arrangements whereby important advantages are had, both in manufacture and use.

In the accompanying drawing Figure 1 is a side view of an electric swivel connection embodying my present invention;

Fig. 2 is an enlarged longitudinal vertical sectional view thereof, taken on line 2—2 of Fig. 1; and Figs. 3 and 4 are cross-sectional views, taken on line 3—3 and 4—4 respectively of Fig. 2.

The preferred construction comprises a main body 5 having a lower section 6 adapted to engage with a stationary socket, an upper section 7 and an intermediate section 8 rigid with section 7 and mounted on section 6 so as to rotate freely thereon. These sections are of insulating material and are shown as being cylindrical, although they may have other shapes.

Section 6 is provided with an annular upstanding constricted part 9 forming an annular seat 10 upon which fits for sliding rotary movements the flange-like extension 8a of section 8. This cylindrical flange-like part 8a is sufficiently long to provide a chamber 11 within its confines. Rising from the top plane of the part 9 there is a central cylindrical projection 12. Section 6 is provided with a central recess 13 in its lower end, and section 8 is provided with a similar central recess 14 in its upper end, while a metal shaft or rivet 15 extends longitudinally through sections 6 and 8 from recess 13 to recess 14, and is on the axis of rotation of said sections. Shaft 15 may be seated firmly in section 6, although it will ordinarily have a sliding fit therein. It extends loosely through an enlarged hole or bore 16 in section 8.

Connection members 17, 17a are preferably of sheet metal and are resilient. They have their inner ends bent at an angle to form portions 18, 18a respectively which rest upon the respective ends of sections 6 and 8. The end portions of shaft 15 pass through holes in these ends 18, 18a and the parts are held together by the heads 19, 19a formed on the ends of the shaft. Said ends or portions 18, 18a of the connector plates 17, 17a are positioned in the recesses 13 and 14 respectively, and the main or intermediate portions of the plates 17, 17a slant outwardly to the seat portions 20, 20a thereof. Retaining screws 21, 21a extend through the end portions 20, 20a into a threaded bore provided therefor in the associated body section.

The shaft 15 and the bent resilient plates 17, 17a hold the two sections 6 and 8 resiliently together and retain flange 8a seated snugly in seat 10 while enabling one section to rotate freely upon the other with a certain desirable yield or give between them provided by the tension of spring members 17, 17a.

Parallel contact elements in the form of prongs 22, 23 extend in a longitudinal direction from the lower end of section 6 and are provided with bent ends 24 and 25 respectively positioned in a recess 26 formed in the lower end of this section outward of the central recess 13. The end 24 is held against the lower side of the seat portion 20 of plate 17 by means of the retaining screw 21, and the end 25 is similarly secured in position in the recess 26 by means of a terminal screw 27, as best shown in Fig. 2.

A pair of curved plates, bars or terminal members, namely an inner path bar 28 and an outer path bar 29, are mounted on the upper end of section 8, the bar 28 being held in place and in contact with the end 20a of connector 17a by the upper retaining screw 21a, and the bar 29 being held in place by a terminal screw 30 which extends through said section 8 into a terminal ring 31 mounted on the lower end of section 8 between opposite sides of the cylindrical flange 8a. A pair of binding posts or binding screws 32 and 33 are threaded in the ends of contact bars 28 and 29 respectively for securing the wires 34 and 35 of the cable 36 in firm electrical contact with said bars 28 and 29.

Means for providing a constant contact between the terminals of sections 6 and 8 are shown as an annular metallic member or disk 37 seated on the upper end of section 6 and around the central projection 12, and held in position by the elongated holding element shown as a screw 27 which extends up through said section into contact with said member. Screw 27 is shown as being threaded into the disc-like brush member 37. It extends into the chamber 11 between the two sections. Its function is to make constant contact with disc-like member 37 and contact element 23. Resilient collecting brushes 38 are formed integral with terminal plate 37 and extend upward therefrom in chamber 11 so as to establish a brushing contact with the terminal ring 31 resting upon the lower end of section 8. The inner end of ring 31 projects into space 11 and is in constant contact with the elongated holding element 30, the function of which is to hold terminal element 29 securely in place and make constant contact with ring 31. Brushes 38 are cut partly free and shaped from the material of plate 37.

Let us assume a plug-in connection to be made with an ordinary type of wall socket adapted to operate with the prongs 22 and 23, and assume that current enters by way of prong 22. The current would pass thence to resilient connector 17, thence through bolt or rivet 15, thence through resilient connector 17a to plate 28 and its binding screw 32 and thence to wire 34 leading to the device or machine to be operated. On the return the current passes through wire 35 to binding screw 33, thence through plate 29 to screw 30 and thence to plate 31, Fig. 2, and thence through the resilient brushes 38 to plate 37 (which is insulated from bolt 15) and thence through screw 27 to terminal prong 23.

The cap 7 is a hollow member or shell shown as being threaded upon the upper end of section 8. It has a central opening 41 through which the cable 36 extends. An annular enlarged band portion 42 is formed around the lower end of the cap to provide a hand-hold or means which can be firmly grasped when applying the device to or removing it from the socket constituting the fixed positive and negative source of current supply.

I contemplate as being included in the present improvements such changes and departures from the specific device shown as are included in the appended claims.

I claim:

1. An electric swivel connection device comprising a pair of insulating body sections which have the outer portions of their adjoining ends formed for rotation upon each other and to provide an enclosed chamber within the body of the device, a pair of contact members on one section, a pair of terminal members on the other section, a shaft headed at each end extending through portions of said sections, a spring conductor at each end portion of the shaft, said conductors pressing outwardly against the heads respectively of the shaft, means connecting one of said spring conductors to one of said terminal elements, means connecting the other spring conductor to one of said contact elements, said shaft holding said sections together whereby one may rotate freely on the other, said spring conductors providing a constant spring-pressed contact between themselves respectively and the shaft, and means providing an electric path between the other contact element and the other terminal element, said last-mentioned means including a contact ring on one section and a disk carrying integral leaf-spring brushes engaging said ring on the other section, said ring and brushes being housed in said chamber.

2. An electric swivel connection of the character described which includes a pair of insulating body sections adapted to each other for rotative relative movements, a pair of contact elements carried by one of the body sections for electrically connecting the device to opposite poles of a fixed source of current, a pair of terminal elements carried by the other body section for connecting conductor wires to the device, means for holding the two sections upon each other for relative rotation, said means including a rigid shaft-like element headed at each end and extending through both sections and serving as a conductor for current from the first one of the contact elements to the first one of the terminal elements, a pair of leaf springs coacting with the heads respectively of the shaft-like element and each of said springs serving as an electrical conductor and means for connecting the second one of the contact members electrically with the second one of said terminal elements, said last-mentioned means including a pair of elongated metallic holding elements, one for each of said sections, one thereof holding the second contact member and the other thereof holding the second terminal element, said body sections being formed to provide a chamber between them interiorly, each of said elongated holding elements extending into said chamber, a metallic ring in said chamber in constant contact with one of said holding elements, and a brush member in said chamber and in constant contact with the other one of said holding elements, said brush member having a spring element in brushing contact with said ring.

3. An electric swivel connection which includes a pair of insulating body sections mounted upon each other for rotative relative movements, a pair of contact elements carried by one of said sections for electrically connecting the device to opposite poles of a fixed source of current, a pair of terminal elements carried by the other one of said sections for connecting conductor wires to the device, retaining means for holding the sections rotatively together and including a shaft having a head at each end, the shaft extending axially through portions of said sections, a pair of resilient conductor members, one thereof being at each end portion of the shaft and pressing outwardly against inner surfaces of the heads respectively of the shaft, said conductor members pressing reactingly against said body sections respectively, the arrangement providing that one body section may rotate freely upon the other thereof with a resilient cushioning action while being held operatively together, said shaft being one of the conductor elements, and means electrically connecting the other one of said terminal elements with the other one of said contact elements in all relative rotative positions of one body section upon the other.

ORVILLE G. HALLIBURTON.